no drawing …

United States Patent Office 3,586,731
Patented June 22, 1971

3,586,731
OLEFIN CONVERSION AND CATALYSTS THEREFOR
Louis F. Heckelsberg, Bartlesville, Okla., assignor to Phillips Petroleum Company
No Drawing. Filed Apr. 3, 1967, Ser. No. 627,636
Int. Cl. C07c 5/00
U.S. Cl. 260—683           16 Claims

ABSTRACT OF THE DISCLOSURE

Olefins are converted to other olefins having different molecular weights by contact with an olefin reaction catalyst active for disproportionating propylene into ethylene and butene comprising silica promoted with an oxide, sulfide or hexacarbonyl of tungsten or molybdenum or with an oxide of rhenium, vanadium, niobium or tantalum and treated with a modifying amount of a compound of an alkali metal or an alkaline earth metal.

---

This invention relates to the conversion of olefin hydrocarbons and to a catalyst for such conversion. In one aspect, this invention relates to the olefin reaction. In another aspect, it relates to the conversion of olefins to other olefins having different molecular weights by contact with an olefin reaction catalyst comprising silica promoted with an oxide, sulfide or hexacarbonyl of tungsten or molybdenum or with an oxide of rhenium, vanadium, niobium, or tantalum and treated with a molifying amount of a compound of an alkali metal or an alkaline earth metal.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention includes at least the following reactions:

(1) The disproportionation of an acyclic mono- or polyene having at least three carbon atoms into other mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene plus 4-methylpentene-2-yields-3-methylbutene-1 and propylene;

(4) The conversion of ethylene or an acyclic mono- or polyene having three or more carbon atoms with a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least 7 carbon atoms and having at least 5 carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

According to the invention the isomerization and/or polymerization reactions which accompany the olefin reactions are substantially eliminated or at least greatly reduced.

It is an object of this invention to provide a method for the conversion of olefins. Another object of this invention is to provide a catalyst for the conversion of olefins. Still another object of this invention is to provide a method for converting olefins to similar olefins of higher and lower numbers of carbon atoms. Still another object is to provide a method for improving the selectivity of a molybdenum, tungsten or rhenium, promoted silica catalyst for the conversion of olefins into similar olefins of higher and lower numbers of carbon atoms. Still another object is to provide a method for quenching the propensity of such a promoted silica olefin reaction catalyst for polymerizing or isomerizing an olefin which is contacted with such catalyst. The provision of a method for selectively modifying acid sites on silica-supported olefin reaction catalyst is still another object of this invention. Still another object is to provide a method for reducing the coke build-up on an olefin reaction catalyst. Other aspects, objects and advantages of my invention will be apparent to one skilled in the art upon reading the disclosure including a detailed description of the invention.

According to the process of this invention, olefins are converted by the olefin reaction under appropriate reaction conditions, including conditions of temperature and residence time to produce products of the olefin reaction, with a catalyst consisting essentially of silica promoted by an oxide, sulfide or hexacarbonyl of tungsten or molybdenum or by an oxide of rhenium and treated with a modifying amount of a compound of an alkali metal or an alkaline earth metal. The alkali metal or alkaline earth metal is preferably added prior to calcination of the catalyst, although, except as noted later, the alkali or alkaline earth metal compound can be added at any time during preparation of the catalyst of the invention.

The alkali metal or alkaline earth metal compounds which can be utilized in the process of the invention are those which will deposit the metal or a metal compound upon the catalyst which are inorganic bases or which form inorganic bases upon calcination. Suitable metal compounds include the oxides, hydroxides, carbonates, bicarbonates, sulfates, halides, nitrates, acetates, and the like of lithium, sodium, potassium, rubidium, cesium, calcium, strontium or barium. Sodium hydroxide, potassium hydroxide, potassium chloride, barium hydroxide and cesium hydroxide are representative of the applicable compounds useful in the practice of the invention.

The amount of alkali metal compound or alkaline earth metal compound added to the promoted catalyst according to this invention can be in the range of about 0.005 to 5 weight percent based on the weight of the catalyst. For reasons of efficiency or economy about 0.01 to 3 weight percent will often be utilized and particularly satisfying results are often obtained with 0.05 to 1 weight percent.

The silica component of the catalyst modified according to the present invention can be any conventional catalyst grade silica. Some examples are precipitated silica gel, microspheroidal silica, flame hydrolyzed silica, and silica aerogels. These materials have appreciable surface area, usually in the range of 50 to 700 m.$^2$/g., and can range from fine powders to coarse granules. These materials often contain small amounts of compounds of aluminum and of sodium, in the order of a few tenths percent by weight, and smaller. Trace amounts of these and other metals are often present, and such small amounts of these materials are acceptable. The alumina content should be below about 1 percent by weight, preferably below about ½ percent although higher concentrations of alumina can sometimes be tolerated.

Because it is generally the major portion of the catalyst, the silica is, for convenience, referred to as the catalyst support. It should be understood, however, that the catalytic agent which has olefin disproportionation activity is the reaction product resulting from the admixture of silica and a suitable promoter material under activating conditions.

The catalysts of this invention can contain other materials which do not substantially promote unwanted reactions. For example, the support can contain substantial amounts of magnesium oxide, or other materials in amount which do not change the essential characteristics of the disproportionation reaction.

When alkali or alkaline earth metals or metal compounds are present in the support materials as impurities, such materials are usually well dispersed in the support material and, therefore, the amount available on the surface is very small and does not exhibit the modifying effect of the invention even when the impurity is present in an appreciable amount. It is presently believed that the alkali or alkaline earth metal modifies the acid sites of the catalyst. The above is true whether or not an alkali or alkaline earth metal or metal compound is originally present in the support as a minor impurity.

The catalysts to be modified by the process of this invention can be prepared by incorporating into a silica-containing base suitable tungsten, molybdenum or rhenium compounds, by conventional methods such as, for example, impregnation, dry mixing, coprecipitation. Suitable tungsten and molybdenum compounds include tungsten oxide and molybdenum oxide, and compounds convertible to these oxides. The finished catalyst base can be in the form of powders, granules, agglomerates, pellets, spheres, extrudates, and the like, depending upon the type of contacting technique employed in the reaction. Except for the inclusion of the alkali or alkaline earth compounds, the catalyst compositions are prepared by methods ordinarily used in the art.

Sufficient promoter is used to obtain the desired activity. Since the promoter compounds usually are more expensive than the support material, unnecessarily large amounts are ordinarily not used. Generally the finished catalyst base contains from 0.1 percent to 30 percent by weight of the selected promoter. However, larger amounts can be used. In most instances, a preferred amount of the promoter is from 1 percent to 20 percent.

The alkali or alkaline earth metal compounds can be incorporated into the catalyst composition by several methods depending upon the specific promoter compounds utilized in the catalyst. When using oxides, or compounds convertible to the oxides, of molybdenum, tungsten or rhenium as the promoter compounds, the alkali or alkaline earth compounds are added to the silica support either before or after incorporation of the promotor compound using such conventional methods as dry mixing or impregnation. It is frequently very convenient to carry out both operations simultaneously such as by, for example, impregnating a suitable silica gel with an aqueous solution containing appropriate amounts of both ammonium molybdate and sodium hydroxide. After the alkali or alkaline earth metal compound is incorporated into the silica support, either in the presence or absence of the promoter material, the silica composite is then heat treated in a procedure which is identical with the activation heat treatment of the finished catalyst. Thus, if the promoter material is present, one heat treatment will suffice for both the catalyst modification and the final catalyst activation.

The modified oxide-promoted catalysts of this invention are activated by heat treatment at temperatures of from 600° to 1500° F. for a period of 1 second to 25 hours or more, shorter times being used with higher temperatures and longer times with lower temperatures. Excellent results are obtained by heat treatment of the fresh catalyst, prior to introduction of the feed, to convert the alkali metal, alkaline earth metal, or promoter compound to the oxide, to dry the catalyst, or otherwise to activate the catalyst. A convenient and economical treatment is obtained by subjecting the catalyst to contact with a stream of air at a temperature in the range of 900° to 1200° F. for from 15 minutes to 5 hours. Other gases, which do not poison the catalyst, for example, nitrogen, also can sometimes be used, either as a substitute for the air treatment, or as a subsequent flush. Air is usually preferred for activation, since it is readily available.

When the hexacarbonyls or sulfides of tungsten or molybdenum are used as the promoter materials, the alkali or alkaline earth metal compounds are added to the support before the promoter materials are incorporated. Thus, the silica is dry mixed or impregnated with the alkali or alkaline earth metal compound. It is then given the above-described heat treatment. The catalyst preparation is then continued by incorporating the hexacarbonyl or sulfide promoter compounds such as, for example, ball-milling the silica composite with tungsten sulfide, or by impregnating the silica composite with a non-aqueous solution, such as a benzene solution, of molybdenum hexacarbonyl. The catalyst preparation is then completed by heat treating these composites in the absence of air. Hexacarbonyl-promoted catalysts can be heated for several seconds up to 10 hours at 50–700° F. in a vacuum. Sulfide-promoted catalysts can be heated for 0.5–20 hours at 800–1400° F. in the presence of nitrogen, noble gases, or mixtures of these.

The catalysts of this invention can be considered a silica-base co-promoted with a compound of tungsten, molybdenum or rhenium and a compound of an alkali metal or an alkaline earth metal.

In the practice of hydrocarbon conversion process of this invention, the modified catalyst can be used, without regeneration, for runs up to 50 hours or more, and can be regenerated repeatedly without appreciable damage. The regeneration can be accomplished by procedures similar to the original activation. For example, oxide-promoted catalysts can be regenerated by contact with diluted air, to remove accumulated coke. The conditions are controlled, by suitable flushing with inert gas before and after the coke combustion step, and by controlling the oxygen content of the regeneration gas, to avoid too rapid or uncontrolled heating. The regeneration temperature should be held below about 1200° F. to avoid catalyst damage. Gas from an inert gas regenerator, nitrogen, steam, or other gases which are inert to the catalyst at regeneration conditions, can be used to control the regeneration temperature.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7 - diethyl - 1,3,5-decatriene, 1,3,5,7,9-octadecapentaene, 1,3-eicosadiene, 4-octene, 3-eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

The operating temperature for the process of this invention to disproportionate propylene using silica-base catalysts, is in the range of 400° to 1100° F. When using a tungsten oxide promoted catalyst, undesired competing reactions can be avoided by holding the operating temperature below about 1000° F. Excellent results are obtained with tungsten oxide catalysts in the range of 600° to 900° F., and with molybdenum oxide catalysts in the range of 800° to 1000° F. Selecting an operating temperature in the higher portions of these ranges makes the catalyst bed less susceptible to poisoning and promotes more rapid recovery from a temporary reduction in activity due to a transient exposure to activity reducing impurities in the feed. In many instances, an operating temperature at or near regeneration temperature can be selected, thus reducing or eliminating costly and time consuming cooling and heating cycles. For higher olefins, the preferred temperature ranges are somewhat lower.

The operating temperature for the process of this invention for reacting cyclic olefins; mixtures of cyclic and acyclic olefins; and mixtures of ethylene with other olefins will be in the range from about 0 to 1200° F. depending upon the specific catalyst utilized. For example, a molybdenum hexacarbonyl-promoted catalyst can be utilized at a temperature of 0 to 600° F.; molybdenum oxide or tungsten oxide on silica is generally utilized at 400 to 1100° F. It is generally preferred to utilize a low conversion rate below 50 percent, for example, and more preferably below 25 percent to avoid production of unwanted quantities of unwanted products.

Generally, the reactions of this invention are essentially independent of pressure, except as pressure affects the density of the feed and thus the contact time. Pressures in the range of 0 to 1500 p.s.i.g. and higher are suitable. However, particularly with higher olefins, especially olefins having at least 5 carbon atoms per molecule, operation at pressures in the lower portion of the range, i.e., below 100 p.s.i.g., preferably in the range of 0–50 p.s.i.g., reduces the tendency to form products more highly branched than the starting material. For conversion of propylene, lower pressures, below about 100 p.s.i.g., when using tungsten oxide promoted catalysts, results in a reduction in activity at a given temperature and contact time. With a molybdenum oxide catalyst, higher pressures tend to increase coke formation on the catalyst when converting propylene. Best operation has been obtained below about 500 p.s.i.g.

The operable range of contact time for this invention process depends primarily upon the operating temperatures and the activity of the catalyst, which is influenced by surface area, promoter concentration, activation, temperature, etc. In general, undesired reactions are favored by longer contact times. Therefore, the contact time should be maintained as short as possible, consistent with desired disproportionation conversion. In this way, conversion due to unwanted reactions can be maintained at a desired low level, and high efficiencies obtained. Conditions and contact times can be selected to attain efficiency of conversion of propylene to ethylene and butenes consistently above 95 percent. In general, lower space rates are associated with lower temperatures.

In general, with a fixed bed reactor and continuous flow operation, weight hourly space velocities in the range of 0.5 to 1000 parts by weight of hydrocarbon feed per part by weight of catalyst per hour are suitable, with excellent results having been obtained in the range of 1 to 500, higher conversion being obtained in the range of 1 to 200. These rates remain constant for changes in density of the feed due to changes in pressure or temperature, but must be adjusted according to the activity of the catalyst and the reaction temperature. At a given temperature, space rate can be varied appreciably, within the stated limits, without substantial loss of efficiency. Space rates given in the examples in this application result in weight hourly space rates in the range of 0.5 to 1000.

The olefin reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the olefin reaction.

The following examples will be helpful in attaining an understanding of the invention; however, the examples should not be construed as unduly limiting the invention. Throughout the examples, percent is by weight unless otherwise stated.

EXAMPLE I

A catalyst containing about 89 weight percent silica, 10 weight percent molybdenum oxide, and 1 weight percent sodium hydroxide was prepared. A 20.27 gram quantity of a nonporous, flame-hydrolyzed silica (Cab-O-Sil) was slurried with a solution containing 2.78 grams ammonium molybdate and 0.23 gram sodium hydroxide in about 400 ml. of deionized water. The slurry was dried on a steam bath, the agglomerates were broken up, the particles were screened, and the 20–40 mesh fraction was retained for further use.

A 5 ml. quantity of the above-prepared catalyst was charged into a glass fixed-bed reaction tube and activated by treating with a flowing stream of dry air for 0.5 hour at 1000° F. Following the activation, the catalyst bed was flushed with nitrogen gas for 5 minutes also at 1000° F.

Propylene was disproportionated by contact with this fixed catalytic bed at atmospheric pressure, a gaseous space rate of 5 v./v./min., and 1000° F. in a run which lasted 8 hours. The effectiveness of the catalytic bed was periodically observed by sampling the effluent stream of the reactor and subjecting it to a chromatographic analysis. The results of these analyses, in weight percent, are seen in the table below.

TABLE I

| Run 1: | | | |
|---|---|---|---|
| Time, hours | 0.5 | 3.5 | 6.5 |
| Ethylene | 2.1 | 3.0 | 2.2 |
| Propylene | 94.0 | 91.3 | 93.7 |
| 1-butene | 0.5 | 0.9 | 0.5 |
| trans-2-butene | 1.9 | 2.6 | 1.9 |
| cis-2-butene | 1.5 | 2.2 | 1.7 |
| Conversion, percent | 6.0 | 8.7 | 6.3 |

At the conclusion of the above 8 hour run, the flow of propylene was halted and the quantity of coke on the catalyst was measured. The coke was measured by first flushing the catalyst bed with nitrogen for 0.5 hour. The carbon was then allowed to burn off from the catalyst by maintaining the bed overnight at 1000° F. with a stream of flowing air passing through it. The resulting carbon dioxide was trapped in ascarite. The coke content of the catalyst was calculated to be 8 weight percent based on the weight of the catalyst.

EXAMPLE II

As a control run, a catalyst containing 90 weight percent silica and 10 weight percent molybdenum oxide but containing no sodium hydroxide was used in an essentially identical propylene disproportionation run. Periodic analyses taken intermittently during this run are shown in the table below.

TABLE II

| Run 2: | | | |
|---|---|---|---|
| Time, hours | 2.5 | 4.5 | 7.25 |
| Ethylene | 4.2 | 2.3 | 1.5 |
| Propylene | 88.2 | 93.4 | 95.9 |
| 1-butene | 1.7 | 0.8 | 0.4 |
| trans-2-butene | 3.3 | 1.9 | 1.2 |
| cis-2-butene | 2.6 | 1.6 | 1.0 |
| Conversion, percent | 11.8 | 6.6 | 4.1 |

At the completion of this 8 hour run, the amount of coke on the catalyst was determined to be 16 weight percent based on the weight of the catalyst.

These two examples show the effectiveness of including a quantity of sodium hydroxide in the catalyst. The coke formation on the alkalized catalyst was reduced. Except for the initial activity, the activity of the alkalized catalyst was maintained at a satisfactory level and was even greater than that of the nonalkalized catalyst.

EXAMPLE III

A catalyst prepared according to the process of Example I, using ammonium tungstate instead of ammonium molybdate, and containing about 92 percent silica, 8 percent tungsten oxide and 0.01 sodium oxide was used to disproportionate propylene at 900° F., 100 p.s.i., and a space velocity of 10 volumes of gas per volume of catalyst per minute (calculated at atmospheric pressure) for 5 hours. Propylene conversion is shown in Run 4 below. The catalyst of Run 3 contained no added sodium and was activated by calcining in air.

TABLE III.—PROPYLENE CONVERSION

| | Percent | |
|---|---|---|
| | Control (Run 3) | Na modified (Run 4) |
| Time on stream, hrs.: | | |
| 1 | 15 | 43 |
| 2 | 23 | 49 |
| 3 | 31 | 51 |
| 5 | 43 | 53 |

The above data show that modifying the catalyst improves conversion level of propylene, particularly in the hours immediately following activation.

EXAMPLE IV

A catalyst prepared according to the process of Example III and containing 0.14 percent sodium oxide was used to disproportionate isobutene at 1050° F., 28–30 p.s.i. and a space velocity of 25 vol. gas/vol. cat./min. Results after 3 hours on stream are compared in the table below with results at similar conditions with the same catalyst not modified with sodium.

TABLE IV

| | Percent | |
|---|---|---|
| Run No | 6 | 7 |
| Na on catalyst | 0 | 0.14 |
| Conversion of isobutene | 14 | 11 |
| Efficiency to ethylene and dimethylbutene | 57 | 88 |

These data show that modifying the catalyst with sodium increases its efficiency of conversion of isobutene to ethylene and dimethylbutene.

EXAMPLE V

The modified catalyst of Example IV was used to convert a substantially equimolar mixture of propylene and isobutene at 1000° F., 28–30 p.s.i. and a space velocity of 25 vol. gas/vol. cat./min. Analysis of the effluent after 4 hours on stream gave results shown in Table V below.

TABLE V

Run No. 8

| | Percent |
|---|---|
| Ethylene | 2.9 |
| Propylene | 9.5 |
| Isobutene | 69.7 |
| Trans-2-butene | 0.9 |
| Cis-2-butene | 0.4 |
| 3-methyl-1-butene | 0.2 |
| 2-methyl-1-butene | 5.2 |
| 2-methyl-2-butene | 9.8 |
| Heavies | 1.7 |

The above results show that the feed of propylene and isobutene is converted principally to 2-methylbutenes and ethylene over the modified catalyst.

EXAMPLE VI

It was found that a substantially equimolar mixture of isobutene and 2-butene was converted to branched pentenes (the precursors of isoprene) over an 8 percent $WO_3$+0.14% Na on $SiO_2$ catalyst in good yields and efficiencies. For example, after three hours on stream at 1000° F., 28–30 p.s.i.g. pressure, and a space rate of 25 $V_g/V_c$/min. an analysis of the effluent gave the following results.

TABLE VI

Run No. 9

| | Percent |
|---|---|
| Ethylene | 0.1 |
| Propylene | 8.7 |
| Isobutene | 57.4 |
| Trans-2-butene | 11.3 |
| Cis-2-butene | 7.7 |
| 3-methyl-1-butene | — |
| 2-methyl-1-butene | 4.8 |
| 2-methyl-2-butene | 9.6 |
| Heavies | 0.4 |

These results indicate that the feed of isobutene and 2-butene is converted mainly to 2-methylbutenes and propylene over this catalyst.

EXAMPLE VII

It has been found that 1-butene is disproportionated to 3-hexene and ethylene over the 8 percent $WO_3$+0.14%

Na on $SiO_2$ catalyst. For example, at atmospheric pressure and a space rate of approximately 100 $V_g/V_c$/min., the following results were obtained using 1-butene as the feed.

TABLE VII.—ANALYSES OF EFFLUENT

| Run No. | 10 | 11 |
|---|---|---|
| Temperature, °F | 950 | 1,000 |
| Time on stream, hours | 5½ | 6½ |
| Ethylene, percent | 2.7 | 4.6 |
| Propylene, percent | 0.3 | 2.1 |
| 1-butene, percent | 87.9 | 69.3 |
| trans-2-butene, percent | | |
| cis-2-butene, percent | | |
| 1-pentene, percent | | 0.3 |
| trans-2-pentene, percent | 0.5 | 1.5 |
| cis-2-pentene, percent | 0.1 | 0.9 |
| 3-hexene, percent | 8.5 | 21.3 |
| Heavies, percent | t | t |
| Conversion, percent | 12 | 31 |
| Efficiency to ethylene and 3-hexene, percent | 92 | 84 |

These data indicate that 1-butene can be converted in good yields and efficiencies to 3-hexene and ethylene. Reducing the isomerization activity reduces side reactions.

EXAMPLE VIII

It has been found that 2-pentene is made from 2-butene over a $WO_3$ on $SiO_2$ catalyst copromoted with sodium. For example:

Catalyst: 8% $WO_3$+0.18% Na on silica pretreated with air at 1100° F. for 1 hour.
Space rate: 10 gf/gc/hr.
Temperature: 1000° F.
Pressure: 30 p.s.i.g.

TABLE VIII

| | Percent | |
|---|---|---|
| | Run No. 12 | Run No. 13 |
| Time on stream (hours) | 1½ | 2½ |
| Analysis of products: | | |
| Ethylene | t | 0.3 |
| Propylene | 9.7 | 13.5 |
| 1-butene | 1.9 | 2.6 |
| trans-2-butene | 40.6 | 34.8 |
| cis-2-butene | 31.0 | 26.5 |
| 1-pentene | 0.1 | 0.3 |
| trans-2-pentene | 10.0 | 12.0 |
| cis-2-pentene | 6.7 | 10.0 |
| Others | 0 | 0 |
| 2-butene conversion | 27 | 36 |
| Efficiency to propylene and 2-pentene | 99 | 98 |

These results indicate that 2-butene can be disproportionated to give propylene and 2-pentene in good yields and high efficiencies over this catalyst.

EXAMPLE IX

A catalyst prepared according to the process of Example III and containing the indicated amount of alkali metal compound or alkaline earth metal compound was used to disproportionate propylene at 800° F. and a space velocity of 50 grams of propylene per gram of catalyst per hour. Results are shown in the following Table IX.

TABLE IX

| Run No.: | Modifier, wt. percent | Propylene conversion, wt. percent | Efficiency percent |
|---|---|---|---|
| 14 | None | 49.8 | 85 |
| 15 | 2-BaO | 47.2 | 89 |
| 16 | 2-BaO [1] | 47.0 | 89 |
| 17 | 0.5-$Cs_2O$ | 47.3 | 91 |
| 18 | 0.4-$K_2O$ | 38.5 | 95 |

[1] BaO added after $WO_3$.

These data show that alkali metal and alkaline earth metal compounds other than sodium are effective in improving the efficiency of the conversion to disproportionation products.

That which is claimed is:

1. A catalyst composition consisting essentially of silica promoted with an oxide, sulfide or hexacorbonyl of tungsten or molybdenum or an oxide or rhenium and deposited upon said catalyst a modifying amount in the range of 0.005 to 5 weight percent of the total catalyst of an inorganic base or a compound which forms an inorganic base upon calcination which is a compound of a metal selected from the group consisting of oxides, hydroxides, carbonates, bicarbonates, sulfates, halides, nitrates, and acetates of lithium, sodium, potassium, rubidium, cesium, calcium, strontium, and barium.

2. The catalyst of claim 1 wherein the modifying amount of an inorganic base is a compound of sodium.

3. The catalyst of claim 2 wherein the modifying amount of a compound of sodium is about 0.01 to 3 weight percent.

4. The catalyst of claim 1 wherein the modifying amount of an inorganic base is barium.

5. The catalyst of claim 1 wherein the modifying amount of an inorganic base is a compound of potassium.

6. The process of converting an olefin hydrocarbon according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbons atoms of each of said new pairs being connected by an olefinic double bond, which comprises contacting at least one olefin hydrocarbon selected from the group consisting of acyclic mono- and polyenes having 3 to 30 carbon atoms per molecule including cycloalkyl and aryl derivatives thereof, cyclic mono- and polyenes having 4 to 30 carbon atoms per molecule including alkyl and aryl derivatives thereof, mixtures thereof and mixtures with ethylene, with a catalyst active for the olefin reaction and consisting essentially of:
silica,
a promoting amount of a compound selected from the group consisting of oxides of tungsten, molybdenum and rhenium, and sulfides and hexacarbonyls of tungsten and molybdenum, and
an added modifying amount deposited on the catalyst in the range of 0.005 to 5 weight percent of the total catalyst of an inorganic base or a compound which forms an inorganic base upon calcination which is a compound of a metal selected from the group consisting of alkali metals and alkaline earth metals,
under conditions, including conditions of temperature within a temperature range of 400 to 1100° F., pressure and contact time, suitable for obtaining an olefin reaction product.

7. The process of claim 6 wherein said modifying amount of an inorganic base is added subsequent to the addition of said promoting amount of a compound.

8. The process of claim 6 wherein said inorganic base is selected from the group consisting of sodium hydroxide, potassium hydroxide, sodium carbonate, potassium chloride, barium hydroxide and cesium hydroxide.

9. The process of claim 6 wherein the compound of an alkali metal or alkaline earth metal is added in an amount of about 0.01 to 3 weight percent of the total catalyst.

10. The process of claim 6 wherein the olefin is propylene.

11. The process of claim 6 wherein the olefin is isobutene.

12. The process of claim 6 wherein said inorganic base is selected from the group consisting of sodium hydroxide, potassium hydroxide, sodium carbonate, potassium chloride, barium hydroxide and cesium hydroxide.

13. The process of claim 12 wherein said catalyst active for the olefin reaction includes the promoting amount of a compound selected from the group consisting of oxides of tungsten, molybdenum, and rhenium.

14. The process of claim 6 wherein said catalyst active for the olefin reaction includes a promoting amount of a compound selected from the group consisting of molybdenum oxide and tungsten oxide.

15. The process of claim 6 wherein the compound of an alkali metal or alkaline earth metal is added in an amount of about 0.01 to 3 weight percent of the total catalyst.

16. The process of claim 6 wherein the compound of an alkali metal or alkaline earth metal is added in an amount of about 0.05 to 1 weight percent of the total catalyst.

References Cited

UNITED STATES PATENTS

| | | | |
|---|---|---|---|
| 2,361,613 | 10/1944 | Drennan | 260—666A |
| 3,261,879 | 7/1966 | Banks | 260—666 |
| 3,340,317 | 9/1967 | Kenton | 260—666A |
| 3,340,322 | 9/1967 | Heckelsberg | 260—683 |
| 3,365,513 | 1/1968 | Heckelsberg | 260—683 |
| 3,395,196 | 7/1968 | Heckelsberg | 260—683 |
| 3,418,390 | 12/1968 | Heckelsberg | 260—683D |
| 3,424,812 | 1/1969 | Howman | 260—683 |
| 3,431,316 | 3/1969 | Banks | 260—683.15 |
| 2,834,823 | 5/1958 | Patton | 260—683.65 |
| 3,442,969 | 5/1969 | Banks | 260—666A |
| 3,424,811 | 1/1969 | Mango | 260—680 |

DELBERT E. GANTZ, Primary Examiner

V. O'KEEFE, Assistant Examiner

U.S. Cl. X.R.

260—666